March 18, 1952 E. L. SCHOFIELD 2,589,295
AUTOMATIC POWER TABLE FOR SIDE SERVICE HEARSES
Filed Sept. 20, 1948 7 Sheets-Sheet 2
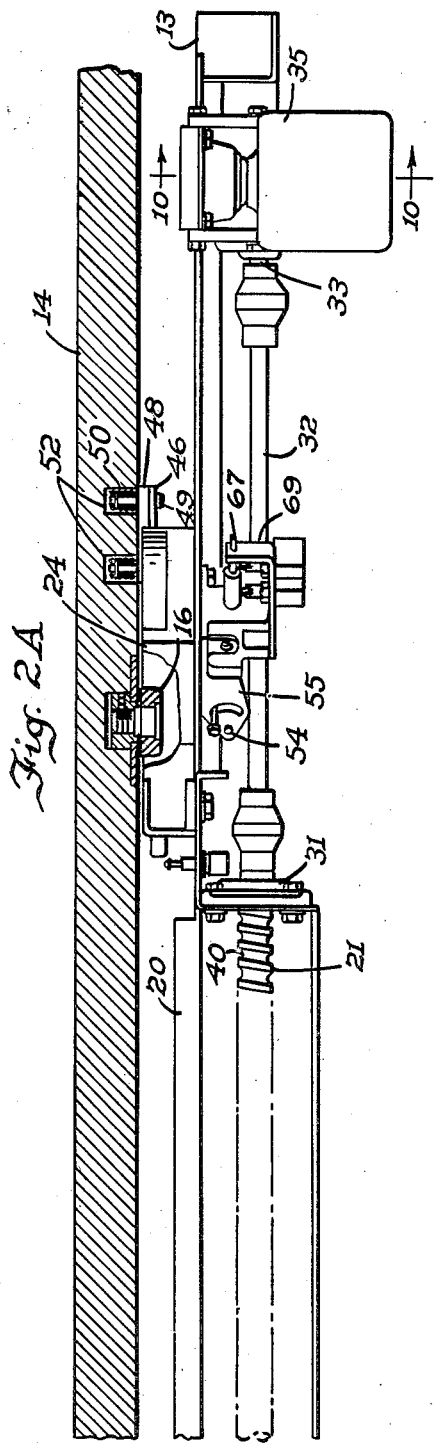
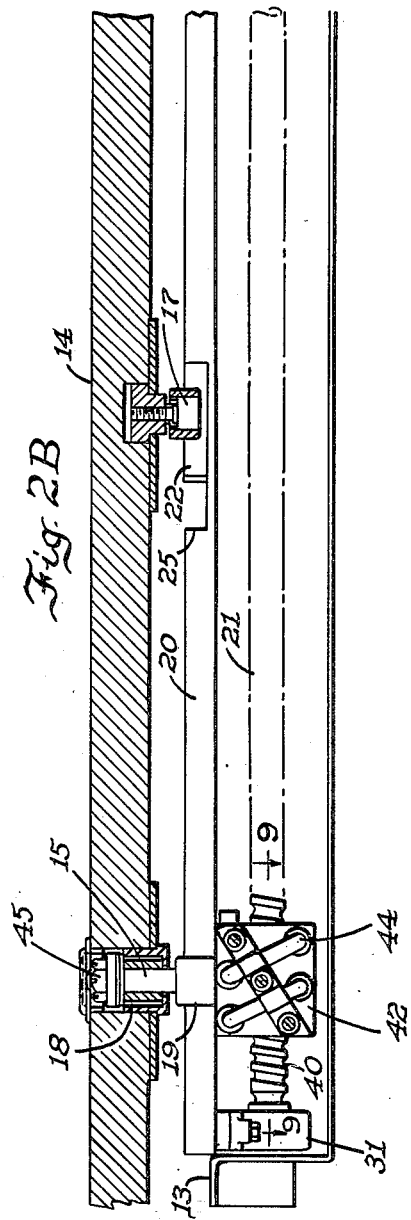
Inventor
Earl L. Schofield March 18, 1952 E. L. SCHOFIELD 2,589,295
AUTOMATIC POWER TABLE FOR SIDE SERVICE HEARSES
Filed Sept. 20, 1948 7 Sheets-Sheet 3
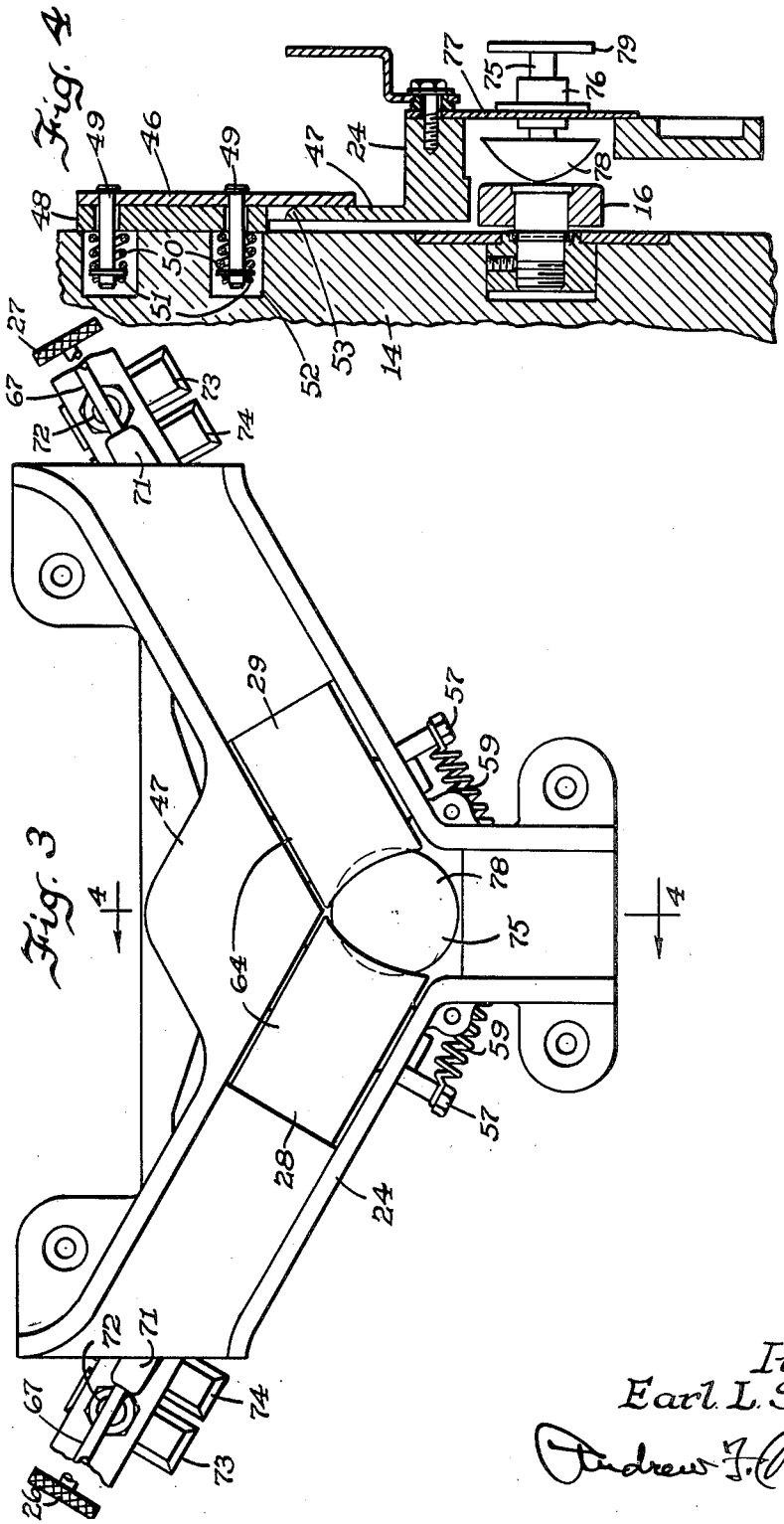
Inventor
Earl L. Schofield
Andrew F. O'Intercom
Atty

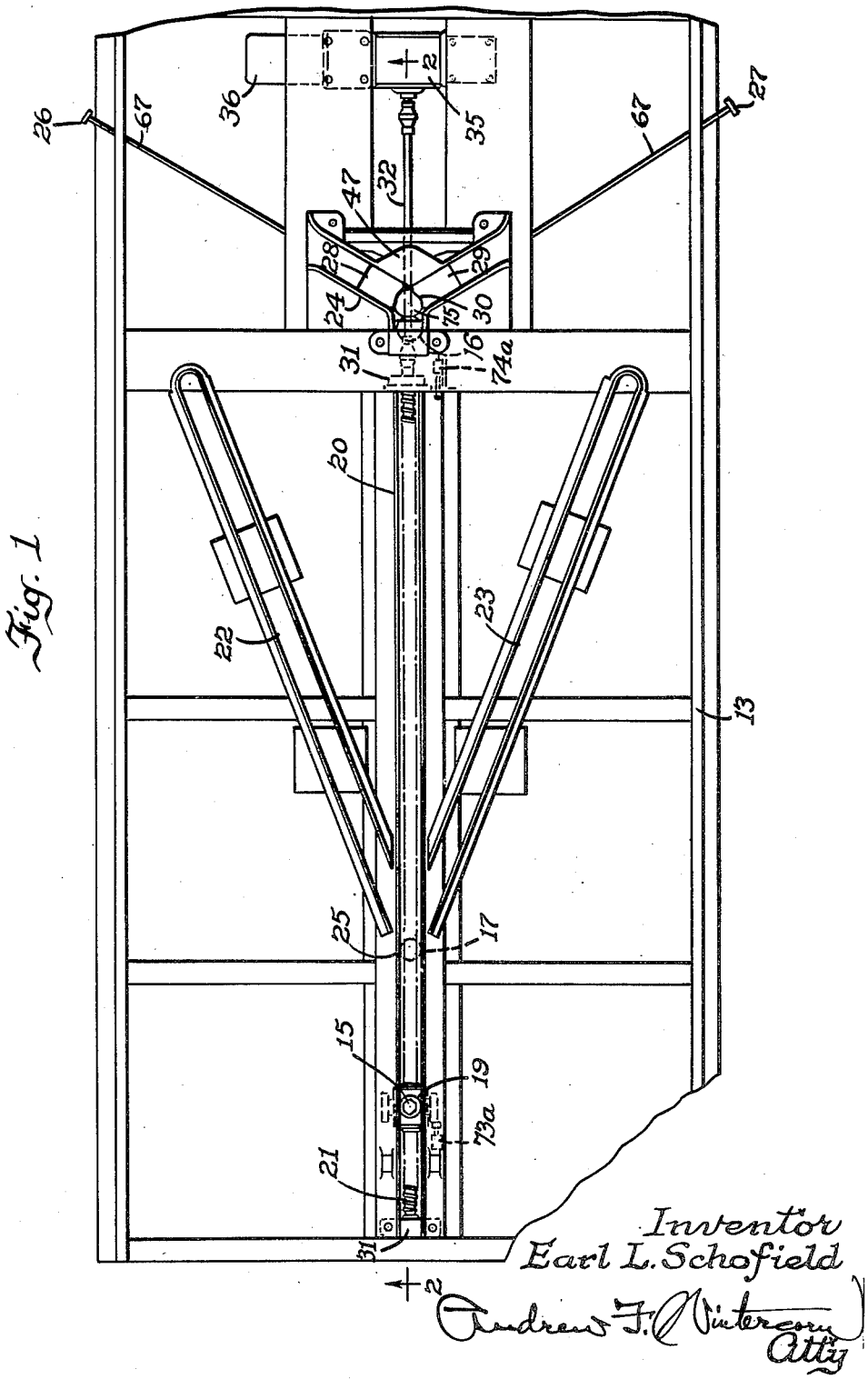

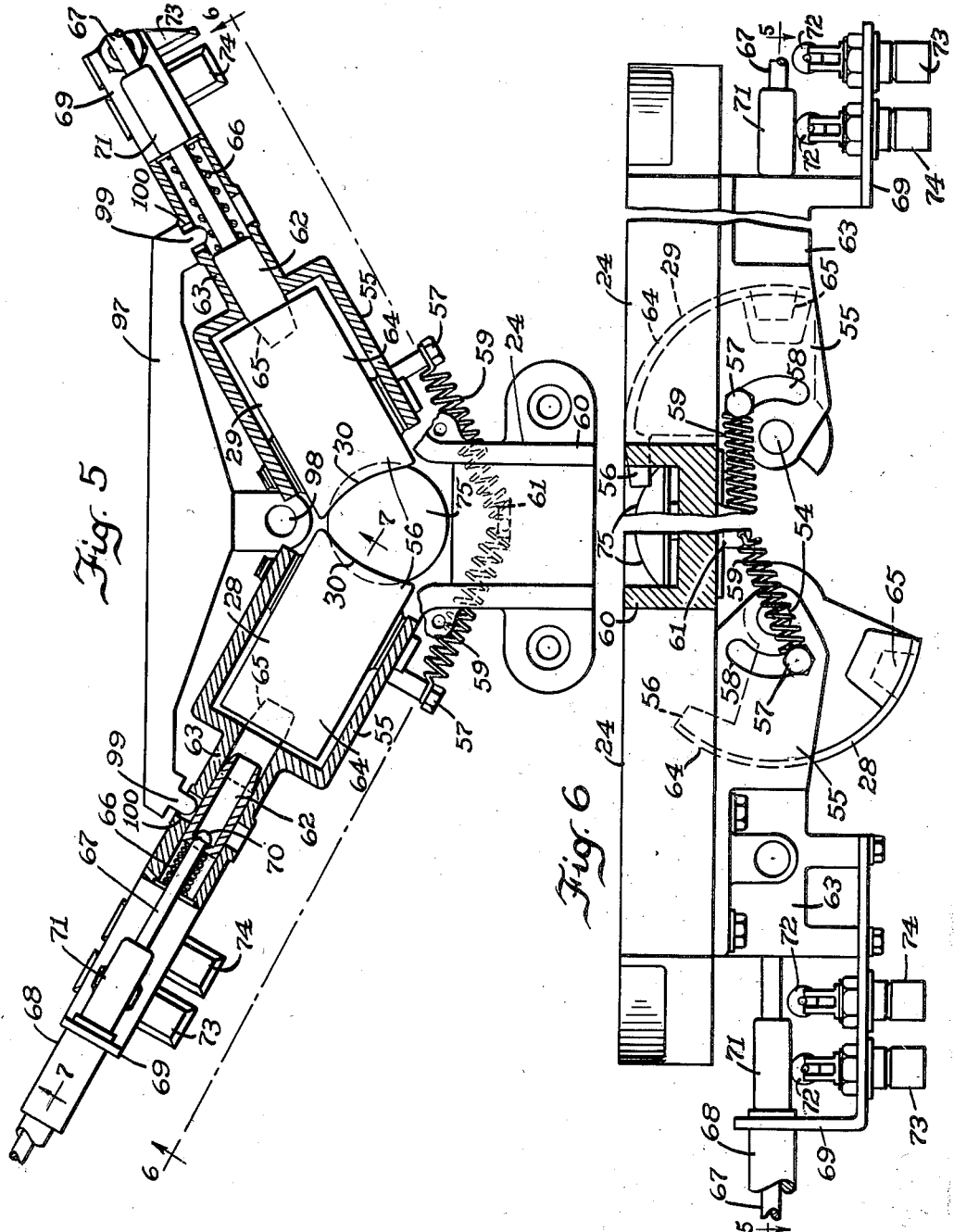

March 18, 1952 — E. L. SCHOFIELD — 2,589,295
AUTOMATIC POWER TABLE FOR SIDE SERVICE HEARSES
Filed Sept. 20, 1948 — 7 Sheets-Sheet 5
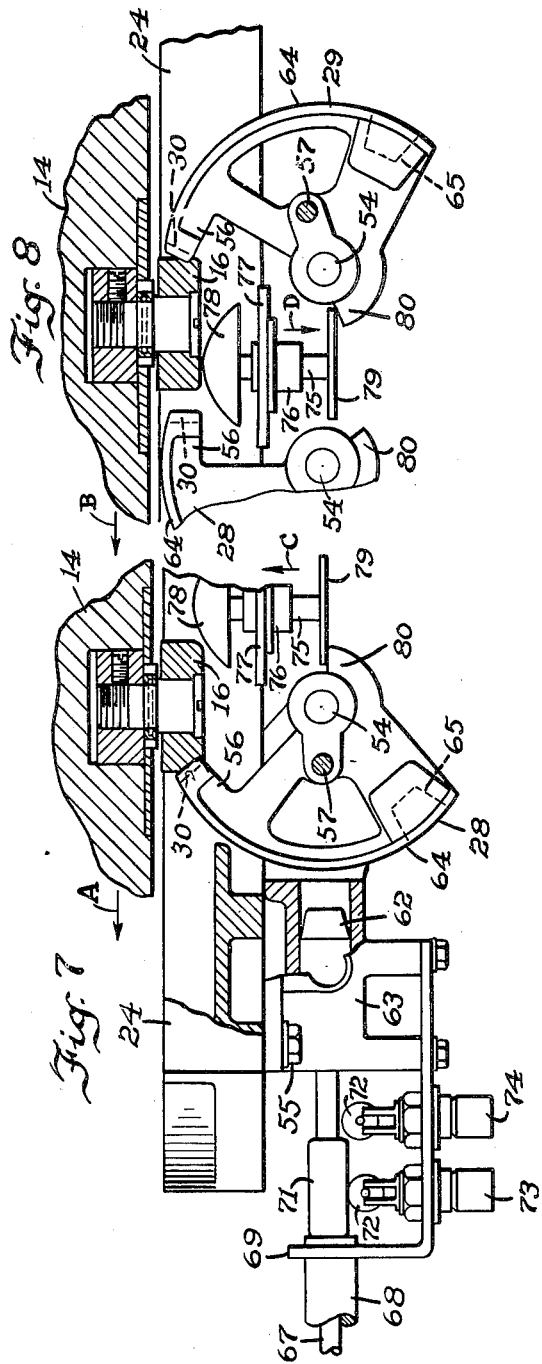
Inventor
Earl L. Schofield March 18, 1952     E. L. SCHOFIELD     2,589,295
AUTOMATIC POWER TABLE FOR SIDE SERVICE HEARSES
Filed Sept. 20, 1948     7 Sheets-Sheet 6
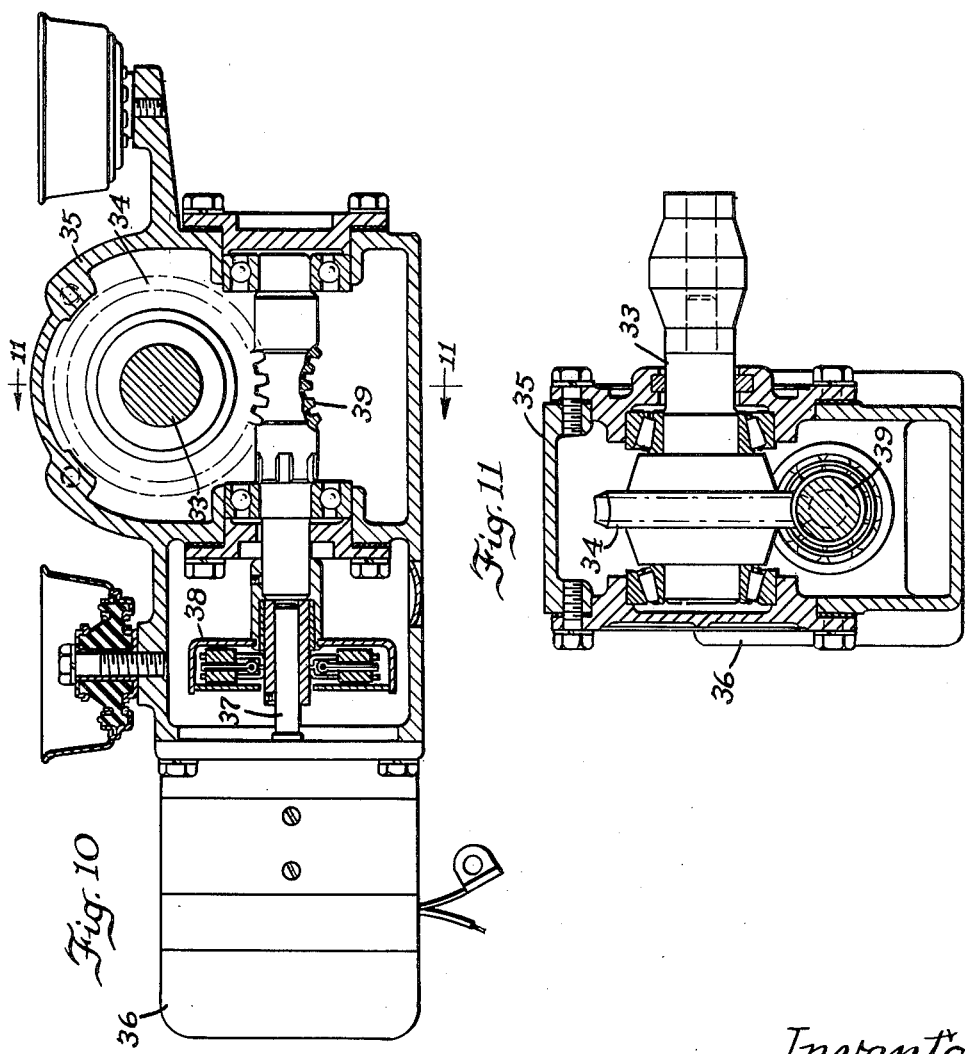
Inventor
Earl L. Schofield March 18, 1952   E. L. SCHOFIELD   2,589,295
AUTOMATIC POWER TABLE FOR SIDE SERVICE HEARSES
Filed Sept. 20, 1948   7 Sheets-Sheet 7
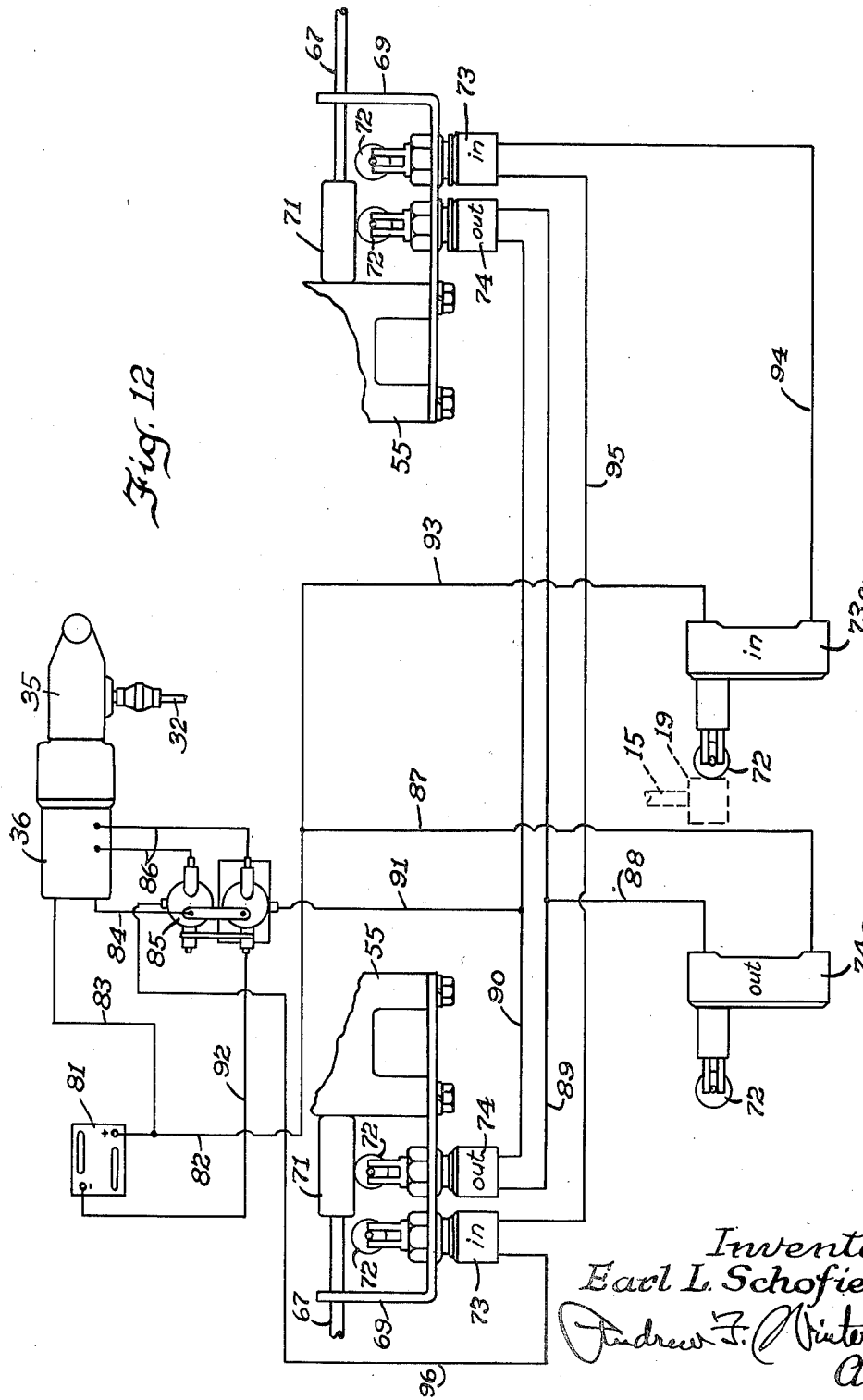

Patented Mar. 18, 1952

2,589,295

UNITED STATES PATENT OFFICE 2,589,295

AUTOMATIC POWER TABLE FOR SIDE SERVICE HEARSES

Earl L. Schofield, Rockford, Ill., assignor to E. L. Schofield, Incorporated, Rockford, Ill., a corporation of Delaware Application September 20, 1948, Serial No. 50,135

47 Claims. (Cl. 214—83.24)

This invention relates to side-service hearses and is more particularly concerned with an improved automatic power table mechanism.

The principal object of my invention is to provide a power mechanism which will compare favorably with the mechanical screw, cables, chain, pneumatic and hydraulic mechanisms heretofore proposed, because of its greater simplicity and economy of construction, and, because, while it retains all the finesse and smoothness and quietness of operation of the better earlier mechanisms, it is so designed that it is definitely far more fool-proof than any other of these others.

Among the more important features of the present power mechanism may be mentioned the following:

(1) A single push-pull control button is provided on each side of the mound at the front corners, directly behind the driver's seat, which button is pulled out for outward movement of the table (without moving the seat), and pushed in for its return, thus giving good directional control, easy for the operator to remember, and avoiding confusion and embarrassment. The control is also so designed that the table cannot be operated accidentally with the doors closed, and the control buttons are interlocked by a safety device, so that only one may be operated at a time.

(2) The electric motor drive is always disconnected from the table operating screw when current is off, thus giving these advantages: (a) Motor starts under no load, thereby permitting use of a much smaller motor with resulting saving in cost and reduced battery drain, there being a centrifugal clutch to insure smooth engagement after the motor has attained a predetermined torque speed; (b) The table may be operated manually at any time without disturbing or disengaging anything in the mechanism, and (c) Motor torque cannot put excessive strain on anything because the centrifugal clutch provides an automatic safety release in the event the casket table hits some obstruction inside or outside the hearse.

(3) The table operating screw is specially designed to cooperate with a ball nut, similar to what have been used heretofore in certain steering gear and other applications, which is reversible in action so that the table can remain permanently connected to it, and when the table is moved by hand, the nut moving with it turns the screw, which, by virtue of the centrifugal clutch mentioned above, is free to turn, the clutch being disengaged whenever power is off. This combination, to afford dual power and manual table operation, is not only simple and fool-proof but, because of the balls, operates more smoothly and quietly and also much more easily, so that there is a minimum drain upon the car battery.

(4) The combination switch and lock mechanism cooperating with the front guide pin on the table incorporates two pivoted jaws in the two forks of a Y-shaped switch, which are spring actuated toward either a raised operative position or a lowered retracted position, and arranged to cooperate with the guide pin so that the one jaw switches the table in the direction of the other fork when the table is moved under power after the operator has unlocked the jaw closing that fork in the switch, the jaws swinging down past a dead-center when pushed out of the way by the guide pin in its outward movement and serving to raise a return plunger, which is thereafter depressed automatically by the guide pin in its return or inward movement, whereby to re-set the jaw in its raised operative position in which it is again automatically locked by the spring pressed latch pin that the operator previously pulled out against the spring's resistance at the start of the table operation.

(5) The push-pull buttons are arranged to operate "in" and "out" electric switches to initiate outward movement of the table in a selected direction whenever the appropriate button is pulled. The buttons have lost-motion operating connections with the latch pins, so that a pin can be pulled out by its associated button, but that button can later be pushed in independently of the pin to initiate inward movement of the table, the pin being spring pressed to go home in its hole in the associated jaw when it is automatically kicked back to raised position at the end of the table return movement.

(6) A rocker member is pivoted relative to the Y-switch and has fingers on its opposite ends which project far enough into the path of the two latch pins so that when either pin is retracted, it causes the rocker to be deflected so that the finger on the remote end thereof projects still farther into the path of its associated latch pin, preventing withdrawal thereof, so that only one latch pin can be operated at a time and the mechanism is rendered fool-proof.

(7) Limit switches of the very dependable "micro" type are used both on the Y-switch, to initiate the "in" and "out" movements of the table, and on the mound, to cooperate directly with fingers provided on the shuttle unit of the table at the "in" and "out" limits of table movement, to stop the motor automatically at these limits, thereby shutting off power until the operator again pushes or pulls a control button.

The invention is illustrated in the accompanying drawings, in which—

Fig. 1 is a plan view of the mound in a hearse, the casket table of which has been removed, but is operated by the power mechanism of my invention installed under the mound, this view showing the table screw and shuttle thereon as well as the power unit, and also showing the Y-shaped switch which steers the table, by means of its front guide pin, to the right or left at the commencement of the side service operation in loading or unloading a casket;

Figs. 2A and 2B are longitudinal sections in a vertical plane through the front and rear end portions, respectively, of the table and mound, taken on line 2—2 of Fig. 1, on a larger scale;

Fig. 3 is an enlarged plan view of the Y-shaped switch, showing the locking jaws on opposite sides of the spheroidal-shaped head of the jaw return-plunger;

Fig. 4 is a longitudinal section in a vertical plane on line 4—4 of Fig. 3, including the front end portion of the table, so as to show how the front guide-pin cooperates with the head of the jaw return-plunger and how the spring-pressed table hold-down plate on the bottom of the table cooperates with the horizontal flange on the front of the Y-switch;

Fig. 5 is a plan view of the Y-switch, showing opposite end portions on the line 5—5 of Fig. 6, to illustrate how the latch pins cooperate with the locking jaws, and also how the push-pull button cables are connected to these latch pins, and how the latch pins are interlocked by a rocker so that only one latch pin can be pulled out at a time;

Fig. 6 is a developed rear elevation of the Y-switch, the two halves being viewed on the broken line 6—6 of Fig. 5, this view serving to illustrate how the buttons on the inner ends of the push-pull cables cooperate with "in" and "out" switches controlling the table power unit;

Fig. 7 is a vertical section on line 7—7 of Fig. 5, illustrating the commencement of a left hand movement of the table, showing how the front guide-pin kicks the released locking jaw out of the way, and how the jaw at the same time raises the return-plunger to its operative position;

Fig. 8 is a similar section, but illustrating the return of the table after a right hand movement;

Fig. 9 is a longitudinal section through the ball-nut portion of the shuttle, taken on line 9—9 of Fig. 2B, on a larger scale;

Fig. 10 is a longitudinal section through the table power unit on line 10—10 of Fig. 2A;

Fig. 11 is a cross-section on line 11—11 of Fig. 10, and

Fig. 12 is a wiring diagram.

The same reference numerals are applied to corresponding parts throughout the views.

Referring first to Figs. 1, 2A, and 2B, the reference numeral 13 designates the mound structure in the body of a hearse, over which the casket table 14 operates, the hearse having the usual doors for use of the driver and a passenger occupying a front seat in front of the table, and having other side doors behind the first doors that are arranged to be opened only when a casket is to be loaded or unloaded from the side of the hearse, these hearses being commonly referred to as side-service hearses. A rear door is also provided through which the casket may be loaded or removed in the ordinary way, when occasion arises. The raised platform or mound 13 in the bottom of the hearse body extends the full length of the body from the rear door up to the front seat, and the casket table is guided in its movement to and from its normal retracted position, extending lengthwise of the mound, by a rear pivot pin 15, and by front and intermediate guide-pins 16 and 17 projecting downwardly from the bottom of the table. The pivot pin 15 fits in a bearing 18 in the rear end portion of the table and extends upwardly from the shuttle 19, which operates in a longitudinally extending guide-way 20 provided on the longitudinal center-line of the mound over and in alignment with the table drive screw 21. The intermediate guide-pin 17 operates in either of two forwardly diverging guide-ways 22 and 23, depending upon whether the casket table is steered by the front guide-pin 16 to the left or right in the Y-shaped switch 24. The guide-ways 22 and 23 open from the opposite sides of the longitudinal guide-way, as indicated at 25, so that the intermediate guide-pin 17 enters the one or the other of these two diverging guide-ways in the first portion of the forward travel of the table, when the front guide-pin 16 is steered into the left or right fork of the switch, depending upon which of the push-and-pull buttons 26 and 27 has been pulled to release the correlated locking jaws 28 or 29 provided on opposite sides of the crotch portion of the switch. The inner end portions 30 of these jaws are curved to serve as cam surfaces, so that when the jaw 28 is released the jaw 29 will steer the front guide-pin 16 to the left, and when the jaw 29 is released the jaw 28 will serve to steer the guide-pin 16 to the right. In either case, before the guide-pin 16 leaves the guide-way in the left or right fork of the switch 24, the intermediate guide-pin 17 is far enough advanced in the related guide-way 22 or 23 to take over all of the guiding functions from that point on to the limit of the outward movement of the table. The screw 21 is supported in bearings 31 at its opposite ends, and the front end is coupled to the rear end of a shaft 32, the front end of which is coupled to a spindle 33 fixed to a worm gear 34 mounted in bearings in a housing 35 suspended from the bottom of the mound at the front end thereof. A reversible electric motor 36 is mounted on one end of the housing 35, as best appears in Fig. 10, and its armature shaft 37 is drivingly connected with the driving half of a centrifugal friction clutch 38, the driven half of which transmits drive to a worm 39 meshing with the worm gear 34 previously mentioned, whereby to provide a drive in which the electric motor 36 is always disconnected from the table drive screw 21 when the current is off, thus giving the advantages:

(a) That the motor starts under no load, thereby permitting use of a much smaller motor, with resultant saving in cost and reduced battery drain; (b) That the table 14 may be operated manually at any time, even when the motor 36 is running and would otherwise be transmitting drive, without disturbing or disengaging anything in the power table mechanism, the clutch 38 being designed to disengage automatically if the operator takes hold of the table to move it slower during power operation thereof, and (c) That the motor torque cannot impose excessive strain on anything, the centrifugal clutch 38 providing an automatic safety release in the event someone gets in the way of the table during power operation or the table hits some fixed obstruction.

Manual operation of the table in both directions is made possible by providing the helical groove 40 in the screw 21 of half-round form and the companion helical grooves 41 of half-round form in the ball-nut 42, provided as a part of the shuttle 19, to accommodate two continuous helical columns of bearing balls 43, the ends of which are connected through ball return ducts 44, in accordance with the principle of the Saginaw steering gear. See Fig. 9 and Patents Nos. 2,159,225, 2,267,524, and 2,380,662. With that construction, when torque is applied to the screw 21 by the motor 36 in either direction, the balls 43 serve to provide anti-friction rolling engagement between the screw 21 and ball-nut 42, and the return ducts 44 provide enclosed passages through which the balls circulate as the nut travels along the screw, giving smooth and quiet as well as very easy operation, so that there is a minimum of drain on the battery, but, what is more important in so far as the present invention is concerned, is that it provides a reversible action, despite the small pitch of the groove 40, so that the table 14 can be permanently connected to the nut 42, and when the table is moved by hand, the nut, moving with it, turns the screw 21, which, by virtue of the provision of the centrifugal clutch 38, is free to turn, the clutch being disengaged whenever power is off. I have, therefore, provided dual power and manual table operation in a mechanical construction offering the same advantages afforded heretofore only with a hydraulically operated casket table, and it goes without saying that the present construction is much simpler and less expensive and less apt to require any attention with years of service.

Suitable casters (not shown) are provided on top of the mound 13 for anti-friction rolling support of the casket table 14. A nut 45 threaded on the upper end of the pivot pin 15 serves to hold the rear end of the table down in assembled relation with the pivot pin 15 and shuttle 19. In the final rearward movement of the table 14, back to its retracted position, a hold-down plate 46 provided on the bottom of the table at the front end engages under a horizontal flange 47 that projects forwardly from the crotch-portion of the switch 24, whereby to hold the front end of the table down and prevent its rattling when the hearse is traveling. The plate 46 is spaced from the bottom of the table by another plate 48, that is suitably secured to the bottom of the table separately. This plate 48 provides a resilient mounting for the hold-down plate 46, there being bolts 49 extending from the hold-down plate loosely through holes in the mounting plate 48 and through coiled compression springs 50, which are held caged in compressed condition on the mounting plate by a cotter-pin and washer, as indicated at 51, the table being recessed on the bottom side, as indicated at 52, to house the springs and projecting end portions of the bolts, as shown in Fig. 4. The front end of the flange 47 is tapered, as indicated at 53, to ride over the rear end of the hold-down plate 46 easily in the rearward travel of the table to its fully retracted position, and, of course, the springs 50, besides allowing for irregularities in dimensions in the assembly, will serve to press the table downwardly resiliently.

Referring now to Figs. 3 to 8, it will be seen that the jaws 28 and 29 are of segmental form and pivotally mounted at 54 in brackets 55 fastened to the bottom of the switch 24. These jaws have substantially right angle projecting portions 56 on their outer ends, the edge portions 30 of which are curved, as previously mentioned, to provide a cam action when the front guide-pin 16 rides against the locked jaw toward the released jaw in steering the table to the right or left, as previously mentioned. Studs 57 projecting from one side of these jaws at a certain radial distance from the pivots 54 operate in arcuate slots 58 provided in the brackets 55 and have coiled tension springs 59 attached to their outer ends, these springs being extended inwardly from opposite sides of the middle leg 60 of the Y-switch and attached to a lug 61 on the bottom thereof, this lug being so located with respect to the pivots 54, as clearly appears in Fig. 6, that they move past a dead-center position with respect to the pivots when the jaws are swung from one extreme position to the other. In Fig. 6 the jaw 28 is shown in retracted position, and the spring 59 holds it down, whereas the jaw 29 is in raised operative position and its spring 59 holds it up. Tubular latch pins 62 are slidable in guides 63 provided in the brackets 55 for movement radially with respect to the segmental-shaped jaws 28 and 29 toward and away from the arcuate peripheries 64 thereof for engagement in radial holes 65 provided therein, whereby to lock the jaws releasably in raised operative position. Coiled compression springs 66 seated in guides 63 behind the pins 62 tend normally to urge the same toward locking position. Cables 67 connected with push-and-pull buttons 26 and 27 extend inwardly through suitable guides 68 provided on auxiliary brackets 69 that are bolted to the brackets 55, and these cables extend through holes in the outer ends of the latch pins 62 and have heads 70 on their inner ends, whereby to provide lost motion operating connections with the latch pins, so that either cable may be pushed in by means of its control button 26 or 27 independently of the position of its associated latch pin 62, as, for example, after the table has been extended from the hearse and is to be returned to retracted position and the push-pull button is accordingly pushed in, although the latch pin 62 is at the time in retracted position relative to its associated jaw 28 or 29 and cannot return to locked position because of the retracted position of the jaw. Under the circumstances the latch pin is merely held pressed against the arcuate periphery 64 of the jaw and will be moved home into hole 65 under spring pressure when the jaw is returned to its raised operative position. A collar 71 is fastened on each of the cables 67 to move back and forth with it in its pull-and-push movements, and rides on plungers 72 of "in" and "out" switches 73 and 74, whereby to hold one or the other of these switches open selectively, the plungers being normally spring pressed outwardly to a closed circuit position. Thus in Fig. 6, for example, the cable 67 on the left has been pulled out for a left hand service operation of the table, and the collar 71 has accordingly been shifted to the left, away from plunger 72 of the "out" switch 74, to close that switch to start the motor 36 and at the same time release the jaw 28 by withdrawal of its latch pin 62. Cable 67 on the right is in its normal position, pushed in, and collar 71 accordingly holds down the plunger 72 of the "out" switch 74 leaving plunger 72 of the "in" switch 73 raised in closed circuit position.

The jaws 28 and 29 are kicked out of the way by the front guide-pin 16 after they have been unlocked by withdrawal of their latch pin 62 and the motor 36 has started the table 14 on its outward travel to the left or right, as illustrated in Figs. 7 and 8, Fig. 7 showing the table at the commencement of its outward travel to the left, and Fig. 8 showing the table at the end of its inward travel from the right. See arrows A and B indicating the direction of table movement depicted. A jaw returning plunger 75 is guided for vertical movement in a bearing 76 provided on a plate 77 fastened to the bottom of the switch 24, and has a spheroidal or mushroom-shaped head 78 on its upper end and a flat disk-shaped head 79 on its lower end. Lugs 80 project radially from the bearing portions of the jaws 28 and 29 to engage the underside of the head 79, as clearly appears in Figs. 7 and 8, so that when the pin 16 kicks a jaw out of the way at the commencement of its outward movement in switch 24, as shown in Fig. 7, the plunger 75 is raised, as indicated by arrow C, so that the head will be in the proper position to be depressed by the pin 16 upon return thereof in the return movement of the table, in order to re-set the jaw 28 in its raised operative position. As soon as the pin 16 has moved the jaw 28 a trifle past the dead-center position of stud 57 with respect to pivot 54 and lug 61 (Fig. 6), spring 59 moves the jaw the rest of the way to the extreme retracted position, and, of course, the plunger 75 is therefore raised proportionately. In the return of the table, the pin 16 riding up the inclined side of the mushroom-shaped head 78 cams it downwardly out of the way, as indicated by arrow D in Fig. 8, and the head 79 bearing against lug 80 raises the jaw 29 to its operative position. Here again the spring 59 takes care of the final upward movement of the jaw as soon as the stud 57 moves past the dead-center position.

The operation of the mechanism can best be understood by reference to the wiring diagram Fig. 12, in which attention is called, first of all, to the additional "in" and "out" switches 73a and 74a, respectively. The plunger 72 of the "in" switch 73a is arranged to be engaged by the shuttle 19 at the end of the return movement of the table so as to break the circuit for the motor 36. The plunger 72 for the "out" switch 74a is likewise engaged by the shuttle 19 at the other limit of travel to break the circuit for the motor 36 at the end of outward movement of the table. Both of the push-and-pull cables 67 are shown pushed in, and the shuttle 19 is accordingly indicated in dotted lines as having engaged and moved plunger 72 for the "in" switch 73a to break the motor circuit, both "in" switches 73 being closed by reason of the fact that the collars 71 are holding only the "out" switches 74 open. Assuming that the left hand button 26 is pulled out for left hand extension of the table, as shown in Figs. 5, 6, and 7, for example, a circuit is completed for the positive side of battery 81 through conductors 82 and 83 to the armature of motor 36, and from the armature through conductor 84 to the contactor 85, through which the field of motor 36 is energized through conductors 86, the circuit through the contactor being completed to the negative side of the battery as follows: From conductor 82 to conductor 87 and "out" switch 74a, to conductor 88 and conductor 89 to "out" switch 74, and conductors 90 and 91 back to the contactor, and conductor 92 to the negative side of the battery 81. Thus the motor 36 will continue to run until shuttle 19 engages plunger 72 of "out" switch 74a, breaking the motor circuit at that point. This is when the table is extended fully from the hearse for loading or unloading of a casket. Then, when the table is to be returned, the button 26 is pushed in, moving collar 71 back to the position shown in Fig. 12, opening the "out" switch 74 and closing the "in" switch 73. The circuit then established is as follows: From the positive side of the battery 81 through conductor 82, and conductor 93 to "in" switch 73a, thence through conductor 94 to the right hand "in" switch 73, and conductor 95 to the left hand "in" switch 73, and thence through conductor 96 to the contactor 85, and through conductor 92 to the negative side of the battery. In this way current flow is established through conductors 86 for the field windings in the reverse direction, due to the circuits of the contactor 85, and the armature of the motor 36, through which current flows from the positive side of the battery through conductors 83 and 84 back to the negative side through conductor 92, is caused to turn in the opposite direction for return movement of the table. This circuit is maintained until the shuttle 19 engages plunger 72 of the "in" switch 73a, as indicated in dotted lines in Fig. 12, and, of course, that occurs when the table is fully retracted. The interconnection of the right and left "in" switches 73 and the right and left "out" switches 74 is clearly shown in Fig. 12, and it is apparent from this interconnection that the mechanism is fool-proof, because one could not make the mechanism work if both of the buttons 26 and 27 were pulled out at the same time. However, to make it impossible to tamper with the mechanism in that way, I provide, as shown in Fig. 5, a rocker arm 97 pivoted intermediate its ends at 98 with respect to the switch 24 and brackets 55 and having lugs 99 projecting from its opposite ends through holes 100 provided in the guide-ways 63. These lugs 99 are rounded on their inner ends so as not to catch on the latch pins 62, but be cammed out of the way when either latch pin is pulled out, as shown at the left in Fig. 5. In that way, due to the length of the lugs 99, when one lug is cammed out of the way, the other lug, due to the rocking motion of arm 97 is moved in far enough to form a positive stop preventing withdrawal of the right hand latch pin 62. Hence, only one of the buttons 26 and 27 can be pulled out at a time.

It is believed the foregoing description conveys a good understanding of the objects and advantages of my invention. The appended claims have been drawn to cover all legitimate modifications and adaptations.

I claim:

1. In a side delivery hearse, the combination of a casket table movable relative to a base, guide means on said base cooperating with the table to guide it for forward and lateral movement from a retracted position in longitudinal alignment with the base to a position in transverse relation thereto projecting laterally from the hearse, a screw extending lengthwise of the hearse and base, a reversible electric motor, a centrifugal friction clutch drivingly connecting said motor with said screw to turn the same selectively in either direction, and a nut threaded on said screw and pivotally connected to the table to transmit longitudinal movement thereto and also permit the table's simultaneous lateral movement, said nut being of a type movable manually with the table in either direction relative to said screw independently of said motor, said clutch being adapted to slip automatically permitting manual operation of the table and automatic disconnection of said motor from said screw in the event of any abnormally high resistance to movement of said table.

2. In a side delivery hearse, the combination of a casket table movable relative to a base, guide means on said base cooperating with the table to guide it for forward and lateral movement from a retracted position in longitudinal alignment with the base to a position in transverse relation thereto projecting laterally from the hearse, a screw extending lengthwise of the hearse and base, a reversible electric motor, a centrifugal friction clutch drivingly connecting said motor with said screw to turn the same selectively in either direction, and a nut threaded on said screw and pivotally connected to the table to transmit longitudinal movement thereto and also permit the table's simultaneous lateral movement, said nut being of a ball type and said screw being grooved to receive the balls and cooperate therewith to afford reversible action, namely, movement of the table by hand, in which the nut drives the screw, the same turning freely relative to the clutch, or the screw, when drive is transmitted thereto, transmitting drive to the nut to move the table under power.

3. In a side delivery hearse, the combination of a casket table movable relative to a base, guide means on said base cooperating with the table to guide it for forward and lateral movement from a retracted position in longitudinal alignment with the base to a position in transverse relation thereto projecting laterally from the hearse, a screw extending lengthwise of the hearse and base, a reversible electric motor adapted to be connected with a source of electric current supply for operation in either direction, a centrifugal friction clutch for connecting said motor and screw when the motor, which starts under no load, attains a predetermined torque speed, and a nut threaded on said screw and pivotally connected to the table to transmit longitudinal movement thereto and also permit the table's simultaneous lateral movement, said clutch permitting automatic disconnection of said power operable means from said screw in the event of any abnormally high resistance to movement of said table.

4. In a power operable device, in which a carriage member movable under power is also adapted to be stopped and moved by hand in either direction, a screw for transmitting movement to said carriage, a reversible electric motor adapted to be connected with a source of electric current supply for operation of the screw in either direction, a centrifugal friction clutch for connecting said motor and screw when the motor, which starts under no load, attains a predetermined torque speed, and a nut threaded on said screw and connected to the carriage to transmit movement thereto, said nut being of a ball type and said screw being grooved to receive the balls and cooperate therewith to afford reversible action, namely, movement of the carriage by hand, in which the nut drives the screw, the same turning freely relative to the clutch, or the screw, when drive is transmitted thereto, transmitting drive to the nut to move the carriage under power.

5. In a hearse of the side delivery type, a casket table supported in said hearse, guide means for said table including one portion extending lengthwise of the hearse and another portion extending laterally relative to the first portion, a table drive screw extending substantially parallel with the first guide and connected with a nut on the table to transmit movement to the table relative to said guides, motive means for transmitting drive to said screw, and a centrifugal clutch connecting said motive means and screw for the triple purpose of (a) permitting start-up of said motive means under no load, (b) transmitting drive to said screw at no lower than a predetermined minimum speed below which the clutch disengages, and (c) disconnecting the drive automatically by disengagement of the clutch in the event of a build-up past a predetermined resistance to movement of the table.

6. In a hearse of the side delivery type, a casket table supported in said hearse, guide means for said table including one portion extending lengthwise of the hearse and other guide portions extending laterally in opposite directions from the first guide, either of which latter guides is used with the first guide for determining movement in one direction or the other toward one side or the other of the hearse, a table guide switch providing diverging tracks in which the table is guided for movement into one or the other of the laterally extending guides, a table drive screw extending substantially parallel with the first guide and connected with the table to transmit movement thereto relative to said guides, an electric motor for driving said screw, switch track blocks in said guide switch which prohibit movement of the table one way or the other to one or the other of the laterally extending guides, latch means locking each of said blocks in table blocking position, manually operable means for releasing either latch means, and electrical switch means controlling the operation of said motor arranged to be closed automatically in the release of either latch means.

7. A structure as set forth in claim 6, including other electrical switch means operable automatically to open position in response to movement of the table to stop said motor when the table reaches either of its limit positions.

8. A structure as set forth in claim 6, including a centrifugal clutch detachably connecting the motor and screw.

9. A structure as set forth in claim 6, wherein the connection between the table and screw includes a ball-nut pivotally connected to the table and threaded on the screw, the ball-nut permitting manual movement of the table in either direction independently of the motor and clutch.

10. In a hearse of the side delivery type, a casket table supported in said hearse, guide means for said table including one portion extending lengthwise of the hearse and other guide portions extending laterally in opposite directions from the first guide, either of which latter guides is used with the first guide for determining movement in one direction or the other toward one side or the other of the hearse, a table guide switch providing diverging tracks in which the table is guided for movement into one or the other of the laterally extending guides, table operating means, an electric motor for driving the table operating means, switch track blocks in said guide switch which prohibit movement of the table one way or the other to one or the other of the laterally extending guides, latch means locking each of said blocks in table blocking position, manually operable means for releasing either latch means, and electrical switch means controlling the operation of said motor arranged to be closed automatically in the release of either latch means.

11. A structure as set forth in claim 10, including other electrical switch means operable automatically to open position in response to movement of the table to stop said motor when the table reaches either of its limit positions.

12. In a hearse, a casket table supported in the hearse for back and forth movement, a screw and ball-nut mechanism operatively connected with the table to transmit movement thereto, and a reversible electric motor connected with the mechanism through the medium of a centrifugal clutch to drive the same and move the table in either direction under power, the centrifugal clutch permitting automatic disconnection of the motor from the mechanism to permit manual operation of the table at decreased speed during power operation thereof, and said ball-nut affording reversible action so that the table is operable under power by power operation of the screw, but when the table is moved by hand the nut drives the screw.

13. In a hearse of the side delivery type, guide means having a guide portion extending lengthwise of the hearse and secondary guide portions extending laterally in diverging relation to the first guide portion, a casket table supported in said hearse and guided by said guide portions, a Y-shaped switch, the middle leg of which is aligned with the first guide portion. a guide projection on the front end of the table movable from the midle leg into either of the diverging legs of said Y-switch, locking jaws in the inner ends of the diverging legs of said switch, which have cam surfaces on their inner faces for cooperation with the guide projection to cam the front end of the table toward one side or the other of the hearse depending upon which jaw is operative and, accordingly, determine the direction of table movement relative to the aforesaid guide portions, said jaws being pivoted to swing downwardly out of the way from operative position, selectively manually operable latch means locking the jaws in operative position locking the table against movement, power operable means for transmitting movement to the table, and means operable by the guide projection on the front end of the table in the return movement of the table to retracted position for automatically resetting in operative position whichever jaw has been unlocked and moved out of the way.

14. A hearse as set forth in claim 13, including spring means connected with the locking jaws so as to hold the same yieldingly in either raised or lowered position, movement of either jaw from one limit position past an intermediate deadcenter position causing the spring means to become effective to urge the jaw toward the other limit position.

15. A hearse as set forth in claim 13, wherein the power operable means for transmitting movement to the table comprises a reversible electric motor, the structure including switch means for controlling the operation of said motor in forward and reverse for outward and inward movement of the table, means for automatically operating said switch means for forward operation of the motor in the releasing movement of said latch means and for reverse operation of the motor in the locking movement of said latch means, and other switch means operable automatically when the table reaches either of its limit positions to break the circuit for the motor and cause stoppage thereof.

16. A hearse as set forth in claim 13, wherein the power operable means for transmitting movement to the table comprises a reversible electric motor, the structure including switch means for controlling the operation of said motor in forward and reverse for outward and inward movement of the table, manually operable push-and-pull rods having lost motion operating connections with the latch means, the lost motion connections including spring means normally urging the latch means toward locking position, the lost motion connections permitting return movement of either of said rods after it has been pulled out for release of the latch means and before the associated latch means has returned to locking position, switch operating means reciprocable with said rods relative to the switch means in the push and pull movements of said rods, whereby to cause forward operation of the motor in the release movement of either of said rods and cause reverse operation of the motor in the return movement of said rod, and other switch means operable automatically when the table reaches either of its limit positions to break the circuit for the motor and cause stoppage thereof.

17. A hearse as set forth in claim 13, wherein the power operable means for transmitting movement to the table comprises a reversible electric motor, the structure including switch means for controlling the operation of said motor in forward and reverse for outward and inward movement of the table, means for automatically operating said switch means for forward operation of the motor in the releasing movement of said latch means and for reverse operation of the motor in the locking movement of said latch means, other switch means operable automatically when the table reaches either of its limit positions to break the circuit for the motor and cause stoppage thereof, and means operable upon release of either of said latch means to block the release of the other latch means and, accordingly, prevent operation of the switch means associated with that latch means.

18. A hearse as set forth in claim 13, wherein the power operable means for transmitting movement to the table comprises a reversible electric motor, the structure including switch means for controlling the operation of said motor in forward and reverse for outward and inward movement of the table, manually operable push-and-pull rods having lost motion operating connections with the latch means, the lost motion connections including spring means normally urging the latch means toward locking position, the lost motion connections permitting return movement of either of said rods after it has been pulled out for release of the latch means and before the associated latch means has returned to locking position, switch operating means reciprocable with said rods relative to the switch means in the push and pull movements of said rods, whereby to cause forward operation of the motor in the release movement of either of said rods and cause reverse operation of the motor in the return movement of said rod, other switch means operable automatically when the table reaches either of its limit positions to break the circuit for the motor and cause stoppage thereof, and means operable upon release of either of said latch means to block the release of the other latch means and, accordingly, prevent operation of the switch means associated with that latch means.

19. A hearse as set forth in claim 13, including a hold-down plate resiliently mounted on the front end of said table and arranged to engage under a forwardly projecting flange provided on the crotch portion of the Y-shaped switch at the end of the return movement of the table, whereby to hold the front end of the table down and prevent rattling thereof when the hearse is in motion.

20. A switching and locking mechanism for use with a guide element to be guided in one direction or another, the mechanism comprising a Y-switch having the guide element movable from the middle leg of said switch into either of the diverging legs thereof, locking jaws in the inner ends of the diverging legs of said switch, which have cam surfaces on their inner faces for cooperation with the guide element to cam the same toward the right or left depending upon which jaw is operative, said jaws being pivoted to swing downwardly out of the way from operative position, selectively manually operable latch means locking the jaws in operative position, and means operable by the guide element in the return movement thereof from either of the diverging legs to the middle leg of the switch for automatically resetting in operative position whichever jaw has been unlocked and moved out of the way.

21. A switching and locking mechanism as set forth in claim 20, including spring means connected with the locking jaws so as to hold the same yieldingly in either raised or lowered position, movement of either jaw from one limit position past an intermediate dead-center position causing the spring means to become effective to urge the jaw toward the other limit position.

22. A switching and locking mechanism as set forth in claim 20, wherein the guide element is operatively associated with a movable member, the movement of which depends upon the operation of its propelling means, a reversible electric motor serving as the propelling means, the structure including switch means for controlling the operation of said motor in forward and reverse for outward and inward movement of the movable member, means for automatically operating said switch means for forward operation of the motor in the releasing movement of said latch means and for reverse operation of the motor in the locking movement of said latch means, and other switch means operable automatically when the movable member reaches either of its limit positions to break the circuit for the motor and cause stoppage thereof.

23. A switching and locking mechanism as set forth in claim 20, wherein the guide element is operatively associated with a movable member, the movement of which depends upon the operation of its propelling means, a reversible electric motor serving as the propelling means, the structure including switch means for controlling the operation of said motor in forward and reverse for outward and inward movement of the movable member, manually operable push-and-pull rods having lost motion operating connections with the latch means, the lost motion connections including spring means normally urging the latch means toward locking position, the lost motion connections permitting return movement of either of said rods after it has been pulled out for release of the latch means and before the associated latch means has returned to locking position, switch operating means reciprocable with said rods relative to the switch means in the push and pull movements of said rods, whereby to cause forward operation of the motor in the release movement of either of said rods and cause reverse operation of the motor in the return movement of said rod, and other switch means operable automatically when the movable member reaches either of its limit positions to break the circuit for the motor and cause stoppage thereof.

24. A switching and locking mechanism as set forth in claim 20, wherein the guide element is operatively associated with a movable member, the movement of which depends upon the operation of its propelling means, a reversible electric motor serving as the propelling means, the structure including switch means for controlling the operation of said motor in forward and reverse for outward and inward movement of the movable member, means for automatically operating said switch means for forward operation of the motor in the releasing movement of said latch means and for reverse operation of the motor in the locking movement of said latch means, other switch means operable automatically when the movable member reaches either of its limit positions to break the circuit for the motor and cause stoppage thereof, and means operable upon release of either of said latch means to block the release of the other latch means and accordingly prevent operation of the switch means associated with that latch means.

25. A switching and locking mechanism as set forth in claim 20, wherein the guide element is operatively associated with a movable member, the movement of which depends upon the operation of its propelling means, a reversible electric motor serving as the propelling means, the structure including switch means for controlling the operation of said motor in forward and reverse for outward and inward movement of the movable member, manually operable push-and-pull rods having lost motion operating connections with the latch means, the lost motion connections including spring means normally urging the latch means toward locking position, the lost motion connections permitting return movement of either of said rods after it has been pulled out for release of the latch means and before the associated latch means has returned to locking position, switch operating means reciprocable with said rods relative to the switch means in the push and pull movements of said rods, whereby to cause forward operation of the motor in the release movement of either of said rods and cause reverse operation of the motor in the return movement of said rod, other switch means operable automatically when the movable member reaches either of its limit positions to break the circuit for the motor and cause stoppage thereof, and means operable upon release of either of said latch means to block the release of the other latch means and, accordingly, prevent operation of the switch means associated with that latch means.

26. A switching and locking mechanism as set forth in claim 20, wherein the locking jaws are segmental-shaped and provide arcuate outer peripheral surfaces on arcs struck with their axes as centers, the jaws having substantially radially directed latch recesses provided therein, opening from the outer peripheries, into which the latch means associated with the jaws are movable substantially radially with respect to the jaws, the latch means including spring means urging the same inwardly toward locking engagement in the recesses in said jaws, whereby said jaws are swingable upwardly to operative position relative to the latch means in the released position thereof independently of said spring means, but said latch means are adapted to ride into their associated recesses under action of the spring means upon alignment of said recesses with said latch means.

27. A switching and locking mechanism for use with a guide element to be guided in one direction or another, the mechanism comprising a Y-switch having the guide element movable from the middle leg of said switch into either of the diverging legs thereof, locking jaws in the inner ends of the diverging legs of said switch, which have cam surfaces on their inner faces for cooperation with the guide element to cam the same toward the right or left depending upon which jaw is operative, said jaws being pivoted to swing downwardly out of the way from operative position, selectively manually operable latch means locking the jaws in operative position, and means operable by the guide element in the return movement thereof from either of the diverging legs to the middle leg of the switch for automatically resetting in operative position whichever jaw has been unlocked and moved out of the way, said means comprising a plunger element guided for vertical reciprocatory movement in the crotch portion of said switch and having heads on its upper and lower ends, the head on the lower end being engaged by projections provided on the pivoted portions of said jaws, whereby the plunger is raised automatically when either jaw is swung downwardly to retracted position, and the head on the upper end of said plunger being engaged by the guide element in the return movement thereof from either of the diverging legs of the switch, whereby to force the plunger downwardly and thereby cause the resetting of the retracted jaw by engagement of the head on the lower end of the plunger with the projection on said jaw.

28. A switching and locking mechanism for use with a guide element to be guided in one direction or another, the mechanism comprising a Y-switch having the guide element movable from the middle leg of said switch into either of the diverging legs thereof, locking jaws in the inner ends of the diverging legs of said switch, which have cam surfaces on their inner faces for cooperation with the guide element to cam the same toward the right or left depending upon which jaw is operative, said jaws being pivoted to swing downwardly out of the way from operative position, selectively manually operable latch means locking the jaws in operative position, and means operable by the guide element in the return movement thereof from either of the diverging legs to the middle leg of the switch for automatically resetting in operative position whichever jaw has been unlocked and moved out of the way, said means comprising a plunger element guided for vertical reciprocatory movement in the crotch portion of said switch and having heads on its upper and lower ends, the head on the lower end being engaged by projections provided on the pivoted portions of said jaws, whereby the plunger is raised automatically when either jaw is swung downwardly to retracted position, and the head on the upper end of said plunger being engaged by the guide element in the return movement thereof from either of the diverging legs of the switch, whereby to force the plunger downwardly and thereby cause the resetting of the retracted jaw by engagement of the head on the lower end of the plunger with the projection on said jaw, the head on the lower end of the plunger being in the form of a flat disk slidable at its periphery on the projections on said jaws which extend substantially radially therefrom.

29. A switching and locking mechanism for use with a guide element to be guided in one direction or another, the mechanism comprising a Y-switch having the guide element movable from the middle leg of said switch into either of the diverging legs thereof, locking jaws in the inner ends of the diverging legs of said switch, which have cam surfaces on their inner faces for cooperation with the guide element to cam the same toward the right or left depending upon which jaw is operative, said jaws being pivoted to swing downwardly out of the way from operative position, selectively manually operable latch means locking the jaws in operative position, and means operable by the guide element in the return movement thereof from either of the diverging legs to the middle leg of the switch for automatically resetting in operative position whichever jaw has been unlocked and moved out of the way, said means comprising a plunger element guided for vertical reciprocatory movement in the crotch portion of said switch and having heads on its upper and lower ends, the head on the lower end being engaged by projections provided on the pivoted portions of said jaws, whereby the plunger is raised automatically when either jaw is swung downwardly to retracted position, and the head on the upper end of said plunger being engaged by the guide element in the return movement thereof from either of the diverging legs of the switch, whereby to force the plunger downwardly and thereby cause the resetting of the retracted jaw by engagement of the head on the lower end of the plunger with the projection on said jaw, the head on the upper end of said plunger being of spheroidal-shape, whereby said plunger is cammed downwardly when the guide element slides over the inclined rounded top surface of said head.

30. In a hearse of the side delivery type, guide means having a guide portion extending lengthwise of the hearse and a secondary guide portion extending laterally in relation to the first guide portion, a casket table supported in said hearse and guided by said guide portions, a table guide switch, one leg of which is aligned with the first guide portion, a guide projection on the front end of the table movable from the one leg into another laterally extending leg of said guide-switch, a locking jaw in the inner end of the second leg of said switch, said jaw being pivoted to swing downwardly out of the way from operative position, manually operable latch means locking the jaw in operative position locking the table against movement, power operable means for transmitting movement to the table, and means operable by the guide projection on the front end of the table in the return movement of the table to retracted position for automatically resetting the jaw in operative position.

31. A hearse as set forth in claim 30, including spring means connected with the locking jaw so as to hold the same yieldingly in either raised or lowered position, movement of the jaw from one limit position past an intermediate deadcenter position causing the spring means to become effective to urge the jaw toward the other limit position.

32. A hearse as set forth in claim 30, wherein the power operable means for transmitting movement to the table comprises a reversible electric motor, the structure including switch means for controlling the operation of said motor in forward and reverse for outward and inward movement of the table, means for automatically operating said switch means for forward operation of the motor in the releasing movement of said latch means and for reverse operation of the motor in the locking movement of said latch means, and other switch means operable automatically when the table reaches either of its limit positions to break the circuit for the motor and cause stoppage thereof.

33. A hearse as set forth in claim 30, wherein the power operable means for transmitting movement to the table comprises a reversible electric motor, the structure including switch means for controlling the operation of said motor in forward and reverse for outward and inward movement of the table, a manually operable push-and-pull rod having lost motion operating connection with the latch means, the lost motion connection including spring means normally urging the latch means toward locking position, the lost motion connection permitting return movement of said rod after it has been pulled out for release of the latch means and before the latch means has returned to locking position, switch operating means reciprocable with said rod relative to the switch means in the push and pull movements of said rod, whereby to cause forward operation of the motor in the release movement of said rod and cause reverse operation of the motor in the return movement of said rod, and other switch means operable automatically when the table reaches either of its limit positions to break the circuit for the motor and cause stoppage thereof.

34. A hearse as set forth in claim 30, including a hold-down plate resiliently mounted on the front end of said table and arranged to engage under a forwardly projecting flange provided on the switch at the end of the return movement of the table, whereby to hold the front end of the table down and prevent rattling thereof when the hearse is in motion.

35. A switching and locking mechanism as set forth in claim 27, including spring means connected with the locking jaws so as to hold the same yieldingly in either raised or lowered position, movement of either jaw from one limit position past an intermediate dead-center position causing the spring means to become effective to urge the jaw toward the other limit position.

36. In a side delivery hearse, the combination of a casket table movable relative to a base, guide means on said base cooperating with the table to guide it for forward and lateral movement from a retracted position in longitudinal alignment with the base to a position in transverse relation thereto projecting laterally from the hearse, a screw extending lengthwise of the hearse and base, a reversible electric motor, a clutch for detachably drivingly connecting said motor with said screw to turn the same selectively in either direction, and a nut threaded on said screw and pivotally connected to the table to transmit longitudinal movement thereto and also permit the table's simultaneous lateral movement, said nut being of a ball type and said screw being grooved to receive the balls and cooperate therewith to afford reversible action, namely, movement of the table by hand, in which the nut drives the screw, the same turning freely relative to the disengaged clutch, or the screw, when drive is transmitted thereto by the clutch, transmitting drive to the nut to move the table under power.

37. In a power operable device, in which a carriage member movable under power is also adapted to be stopped and moved by hand in either direction, a screw for transmitting movement to said carriage, a reversible electric motor adapted to be connected with a source of electric current supply for operation of the screw in either direction, a clutch for detachably connecting said motor and screw, and a nut threaded on said screw and connected to the carriage to transmit movement thereto, said nut being of a ball type and said screw being grooved to receive the balls and cooperate therewith to afford reversible action, namely, movement of the carriage by hand, in which the nut drives the screw, the same turning freely relative to the disengaged clutch, or the screw, when drive is transmitted thereto by the clutch, transmitting drive to the nut to move the carriage under power.

38. A hearse structure as set forth in claim 5, wherein the nut on the table connected with the drive screw is of a ball type, the screw being grooved to receive the balls to cooperate with the nut to afford reversible action, namely, movement of the table by hand, in which the nut drives the screw, or movement of the table by means of the screw, in which the screw transmits drive to the nut to move the table.

39. A hearse as set forth in claim 30, wherein the power operable means for transmitting movement to the table comprises a reversible electric motor, the structure including switch means for controlling the operation of said motor in forward and reverse for outward and inward movement of the table, and means for automatically operating said switch means for forward operation of the motor in the releasing movement of said latch means and for reverse operation of the motor in the locking movement of said latch means.

40. A hearse as set forth in claim 30, wherein the power operable means for transmitting movement to the table comprises a reversible electric motor, the structure including switch means for controlling the operation of said motor in forward and reverse for outward and inward movement of the table, a manually operable push-and-pull rod having lost motion operating connection with the latch means, the lost motion connection including spring means normally urging the latch means toward locking position, the lost motion connection permitting return movement of said rod after it has been pulled out for release of the latch means and before the latch means has returned to locking position, and switch operating means reciprocable with said rod relative to the switch means in the push and pull movements of said rod, whereby to cause forward operation of the motor in the release movement of said rod and cause reverse operation of the motor in the return movement of said rod.

41. A hearse as set forth in claim 30, wherein the power operable means for transmitting movement to the table comprises a reversible electric motor, the structure including switch means for controlling the operation of said motor in forward and reverse for outward and inward movement of the table, means for automatically operating said switch means for forward operation of the motor in the releasing movement of said latch means and for reverse operation of the motor in the locking movement of said latch means, and means operable upon release of either of said latch means to block the release of the other latch means and, accordingly, prevent operation of the switch means associated with that latch means.

42. A hearse as set forth in claim 30, wherein the power operable means for transmitting movement to the table comprises a reversible electric motor, the structure including switch means for controlling the operation of said motor in forward and reverse for outward and inward movement of the table, manually operable push-and-pull rods having lost motion operating connections with the latch means, the lost motion connections including spring means normally urging the latch means toward locking position, the lost motion connections permitting return movement of either of said rods after it has been pulled out for release of the latch means and before the associated latch means has returned to locking position, switch operating means reciprocable with said rods relative to the switch means in the push and pull movement of said rods, whereby to cause forward operation of the motor in the release movement of either of said rods and cause reverse operation of the motor in the return movement of said rod, and means operable upon release of either of said latch means to block the release of the other latch means and, accordingly, prevent operation of the switch means associated with that latch means.

43. A switching and locking mechanism as set forth in claim 20, wherein the guide element is operatively associated with a movable member, the movement of which depends upon the operation of its propelling means, a reversible electric motor serving as the propelling means, the structure including switch means for controlling the operation of said motor in forward and reverse for outward and inward movement of the movable member, and means for automatically operating said switch means for forward operation of the motor in the releasing movement of said latch means and for reverse operation of the motor in the locking movement of said latch means.

44. A switching and locking mechanism as set forth in claim 20, wherein the guide element is operatively associated with a movable member, the movement of which depends upon the operation of its propelling means, a reversible electric motor serving as the propelling means, the structure including switch means for controlling the operation of said motor in forward and reverse for outward and inward movement of the movable member, manually operable push-and-pull rods having lost motion operating connections with the latch means, the lost motion connections including spring means normally urging the latch means toward locking position, the lost motion connections permitting return movement of either of said rods after it has been pulled out for release of the latch means and before the associated latch means has returned to locking position, and switch operating means reciprocable with said rods relative to the switch means in the push and pull movements of said rods, whereby to cause forward operation of the motor in the release movement of either of said rods and cause reverse operation of the motor in the return movement of said rod.

45. A switching and locking mechanism as set forth in claim 20, wherein the guide element is operatively associated with a movable member, the movement of which depends upon the operation of its propelling means, a reversible electric motor serving as the propelling means, the structure including switch means for controlling the operation of said motor in forward and reverse for outward and inward movement of the movable member, means for automatically operating said switch means for forward operation of the motor in the releasing movement of said latch means and for reverse operation of the motor in the locking movement of said latch means, and means operable upon release of either of said latch means to block the release of the other latch means and accordingly prevent operation of the switch means associated with that latch means.

46. A switching and locking mechanism as set forth in claim 20, wherein the guide element is operatively associated with a movable member, the movement of which depends upon the operation of its propelling means, a reversible electric motor serving as the propelling means, the structure including switch means for controlling the operation of said motor in forward and reverse for outward and inward movement of the movable member, manually operable push-and-pull rods having lost motion operating connections with the latch means, the lost motion connections including spring means normally urging the latch means toward locking position, the lost motion connections permitting return movement of either of said rods after it has been pulled out for release of the latch means and before the associated latch means has returned to locking position, switch operating means reciprocable with said rods relative to the switch means in the push and pull movements of said rods, whereby to cause forward operation of the motor in the release movement of either of said rods and cause reverse operation of the motor in the return movement of said rod, and means operable upon release of either of said latch means to block the release of the other latch means and, accordingly, prevent operation of the switch means associated with that latch means.

47. A switching and locking mechanism as set forth in claim 20, wherein the locking jaws are segmental-shaped and provide arcuate outer peripheral surfaces on arcs struck with their axes as centers, the jaws having substantially radially directed latch recesses provided therein, opening from the outer peripheries, into which the latch means associated with the jaws are movable substantially radially with respect to the jaws, the latch means including spring means urging the same inwardly toward locking engagement in the recesses in said jaws, whereby said jaws are swingable upwardly to operative position relative to the latch means in the released position thereof independently of said spring means, but said latch means are adapted to ride into their associated recesses under action of the spring means upon alignment of said recesses with said latch means, and spring means connected with the locking jaws so as to hold the same yieldingly in either raised or lowered position, movement of either jaw from one limit position past an intermediate dead-center position causing the spring means to become effective to urge the jaw toward the other limit position.

EARL L. SCHOFIELD.

REFERENCES CITED

The following references are of record in the file of this patent:

UNITED STATES PATENTS

| Number | Name | Date |
|---|---|---|
| 417,087 | Pratt | Dec. 10, 1889 |
| 888,619 | Kelly | May 26, 1908 |
| 1,704,031 | Boehm | Mar. 5, 1929 |
| 1,775,463 | Jacobs | Sept. 9, 1930 |
| 1,922,094 | Jacobs | Aug. 15, 1933 |
| 2,085,043 | Richter | June 29, 1937 |
| 2,229,483 | Toulmin, Jr. | Jan. 21, 1941 |
| 2,284,116 | Bench et al. | May 26, 1942 |
| 2,284,187 | Crosby et al. | May 26, 1942 |
| 2,398,065 | Werner | Apr. 9, 1946 |